United States Patent

Mannes

[15] 3,642,038
[45] Feb. 15, 1972

[54] SABRE SAW

[72] Inventor: Gunter Mannes, Remscheid-Bliedinghausen, Germany

[73] Assignee: Stichling-Werkzeugfabrik Honneknovel & Co., Burger Strasse, Germany

[22] Filed: Jan. 29, 1970

[21] Appl. No.: 6,654

[30] Foreign Application Priority Data

Sept. 30, 1969 Germany ................ P 19 49 215.0

[52] U.S. Cl. ............................ 143/68 E, 144/133 D, 145/130
[51] Int. Cl. .................................................. B27b 19/08
[58] Field of Search ......................... 143/133 D, 133, 72, 68; 145/130, 31

[56] References Cited

UNITED STATES PATENTS

| 2,652,075 | 9/1953 | Mannes .......................... 145/130 X |
| 2,635,652 | 4/1953 | Norquist ............................. 143/133 |
| 152,970 | 7/1874 | Chase .............................. 143/133 D |
| 1,951,880 | 3/1934 | Niederhofer ................... 143/133 X |

Primary Examiner—Donald R. Schran
Attorney—Milton J. Wayne

[57] ABSTRACT

A sabre saw having helically twisted teeth extending from its attaching end to its remote end. The attached end is driven with reciprocatory motion, and the teeth are shaped to be inclined upwardly to cut as the sabre saw moves toward the attaching end.

2 Claims, 6 Drawing Figures

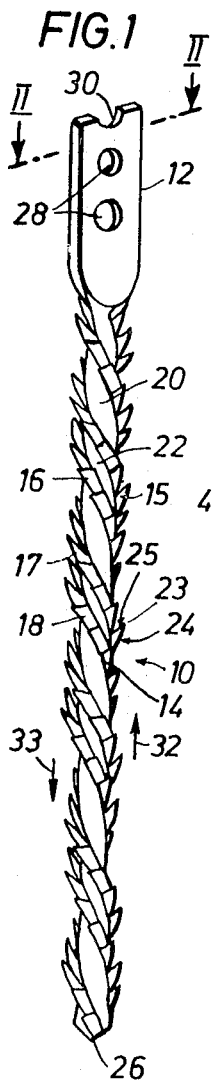
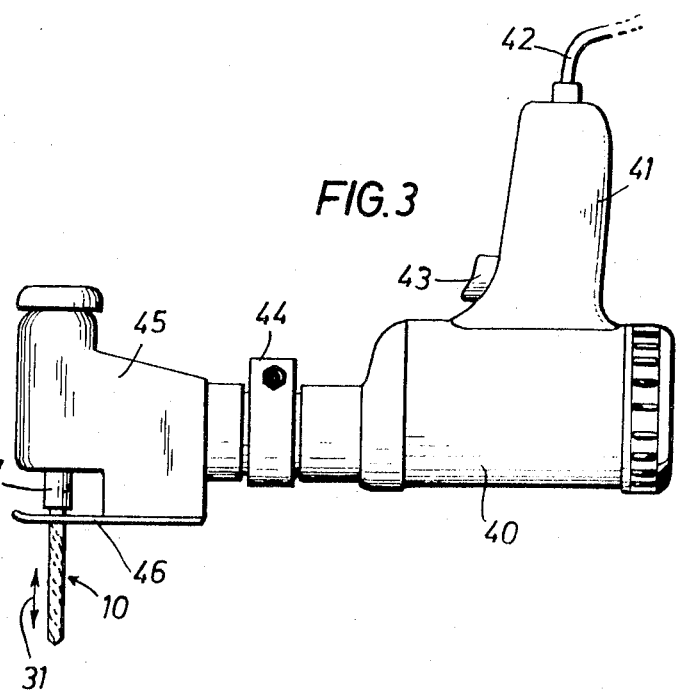
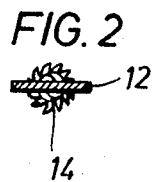
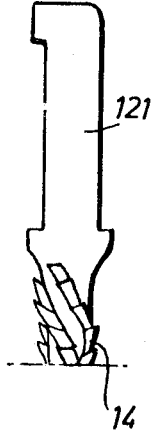
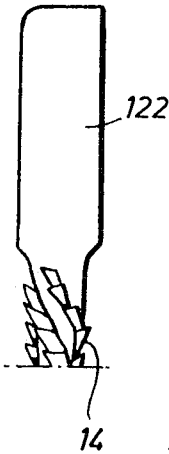
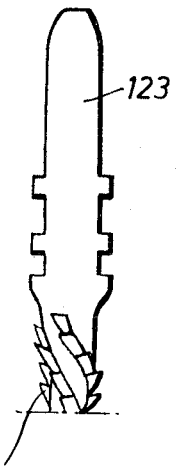

SABRE SAW

The invention concerns a sabre saw and particularly, although not exclusively, for use in a sabre saw tool driven by an electromotor.

Sabre saw tools having an electromotor, as a special tool or as a supplementary tool in combination with a manual drill have been known for a long time. These tools have a transmission which converts the rotary motion of the electromotor shaft into a reciprocating motion whereby this transmission or drive moves a clamping head into which sabre saw blades can be fastened. The known sabre saw blades are short, with relatively thin and wide steel blades, provided at one end with a fastening-head for fastening into a clamp and having teeth along one side edge. The type of teeth varies and depends on the type of material to be sawed. For the purpose of imparting the necessary stiffness to the blade which is clamped in at one end and is movable up and down, the part of the saw blade not comprising its teeth must be relatively broad. To this breadth is added the teeth depth so that the known sabre saw blades are relatively broad. The result is that by means of these known sabre saw blades it is possible, in addition to making straight cuts, to make only cuts having a relatively great radius of curvature. However, using such known sabre saw blades, an undesirable jamming of the saw blade in the material to be cut may occur. Furthermore, with these known saw blades, it is possible to make a saw cut in only one direction, namely that in which the saw teeth face. It is not possible with such blades to make cuts that run as desired, for example at angles, undulated, or that widen out at some places.

Furthermore, boring saws have been known for a long time. Boring saws consist of a metal rod having a handle or a fastening-head for fastening in a drill press at one end, while its metal shaft is at its other end made as a drill or borer, the remainder of its length being provided with peripheral teeth. When such a boring saw is used in a drill press, it is driven by rotating the peripherally toothed rod about its longitudinal axis. These borer saws have the advantage of making it possible to bore a hole in a piece of work, and then, starting out from this hole and by means of the peripheral teeth of the metal shaft, to produce a kind of milled cut whereby the speed of the sawing is necessarily relatively slow. There is no sawing motion, or a to-and-fro sawing motion but only a milling rotary motion of the peripherally toothed metal shaft.

The fundamental object of this invention is to provide a sabre saw for use in a sabre saw implement which overcomes the disadvantages of the traditional sabre saw blades and makes it possible to produce saw cuts of any desired radius of curvature.

The cutting direction of the sabre saw of this invention is entirely as desired that is, the course of the saw cut can at any time be changed to any direction desired and it is also possible to widen the saw cut having a round or cornered contour.

An essential feature of the present invention is that the sabre saw of this invention produces a genuine sawing motion and not milling motion, as, in sawing, the cutting speed is substantially greater than in a milling operation, and furthermore, in a sawing operation, the sawing tool becomes less heated through friction than a milling tool since it is in continuous engagement with the cut. Above all however, many materials can be cut by a sawing motion because, for example, in machining synthetic material by means of a milling tool, the milling-cutter teeth become plugged up immediately with a mass of the synthetic material.

The solution of the present problem, and of other problems immediately evident to one skilled in the art, is effected by means of a sabre saw which, in accordance with the present invention, has peripheral teeth and is particularly suitable to be driven by an electromotor.

Thus, whereas up to the present time, there have been used exclusively as sabre saws, blades having saw teeth along one longitudinal edge with which the aforesaid disadvantages of traditional saw blades were associated, the present invention is concerned with a sabre saw with peripheral teeth which, in a sabre saw implement, functions as a genuine saw, and because of its peripheral teeth, it is possible to change the direction of the saw cut at any time, to enlarge the cut as desired, etc. Because of the reciprocating motion of the sabre saw of the present invention, there is no danger of a clogging of the saw by chips of the material being sawed. On the contrary, the sabre saw of the present invention, during its reciprocating motion, cleans itself automatically and continuously. A peripherally toothed saw is moreover "free-cutting" that is, it cuts a sufficiently wide channel in which it does not bind, as is the case with a thin saw blade of the traditional type.

In accordance with a preferred embodiment of the present invention, there is provided a sabre saw consisting of a rod, illustratively, polygonal in cross section, provided at each of its edges with teeth twisted helically about its longitudinal axis. The cross section of this rod can have typically three sides or it can be quadrangular, or polygonal, and the side edges of the cross section may moreover be curved outward or inward. The rod preferably is however of rectangular cross section because in this case, particularly favorable channels result for carrying away the chips.

In a way known for sabre saws, it is provided that the saw should have a fastening head at one end for fastening the saw detachably in the implement driving it, while in accordance with the present invention, the teeth are made so that the stroke of the saw toward the driving implement is the cutting stroke (pull teeth); during the cutting stroke the saw is pulled toward its driving apparatus and during the return movement, the backs of the teeth slide over the material which is being cut. The free end of the saw is advantageously pointed.

Further information, characteristics and advantages of the invention are evident from the following description of one example of construction whereby reference is made to the accompanying drawings, in which:

FIG. 1 shows a perspective representation of one illustration of construction of a sabre saw according to the present invention;

FIG. 2 shows a section along line II—II of FIG. 1;

FIG. 3 shows a schematic side view of a hand drill with a sabre saw tool; and

FIG. 4, 5 and 6 show possible forms of construction of the fastening head of the sabre saw.

The sabre saw, designated in a general way by 10, consists essentially of a fastening head 12 and of the saw shaft proper 14. In the case of the illustrated example, this saw shaft 14 is rectangular in cross section and is provided at its four edges with teeth 15, 16, 17 and 18 respectively, and is then twisted helically about its longitudinal axis whereby a desired spreading-apart of its teeth occurs. The broad helically situated sides 20 of the rectangular rod, but on occasion also the narrow sides 22, form channels through which the chips are carried away.

It should be stated expressly that the illustrated rectangular cross section of the rod 14, while it represents a preferred form of construction, does not however in any way limit the scope of the present invention. The rod forming the saw shaft 14 may also have a square cross section or any other type of cross section; however, it is believed that the performance of the chip-removing channels would be less efficient.

The saw shaft 14 is advantageously pointed at its free end as shown at 26.

The individual teeth of the sets of teeth 15 to 18 are made so that the cutting stroke of the sabre saw takes place during its movement in the direction of the arrow 32; that is, the driving mechanism during the cutting stroke pulls the sabre saw 10 while during the return stroke, in the direction of the arrow 33, the sabre saw 10 is pushed through the material. For this purpose, the front edges 25 of the individual teeth lie closer to the attaching head 12 than do their back edges 24, both the said edges running from the tooth tip 23. As clearly seen in FIG. 1, front or leading edges 25 have substantially the same downward inclination from tips 23 as back or trailing edges 24.

The form of tooth shown in FIG. 1 is particularly suitable for working on wood, plastics and similar materials. Obviously, other suitable forms would be used for working with metal, for example.

The attaching head 12 of the example of construction illustrated in FIG. 1 consists of a flat board end piece in which are provided two holes 28, and a recess 30 in the upper front side. These details of the fastening head 12 are not essential to the invention and depend on the design of the clamp of the sabre saw tool. Various commercial forms of clamping heads are shown in FIGS. 4, 5 and 6 where the fastening head 121 according to FIG. 4 has at its lower end two projecting shoulders; while the fastening head 122 according to FIG. 5 is a kind of rectangular plate with a rounded end edge; and the attaching head 123 of FIG. 6 forms a lancet-shaped flat end rod with lateral projections.

FIG. 3 shows the use of the sabre saw according to the present invention in combination with a hand drill 40 and a sabre saw supplementary tool 45. The hand drill 40 in the usual way has a handle 41 with a connecting cable 42 and a switch button 43. By means of a clamp ring 44, the sabre saw supplementary tool 45 is fastened to the hand drill whereby the shaft of the hand drill drives a transmission which converts the rotary motion of the hand drill into a reciprocating motion which is imparted to the clamp 47 for clamping in the sabre saw 10, which moves to and fro in the direction of the double arrow 31. In a known manner, the sabre saw supplementary tool 45 is provided with a table or with a fork 46 for holding down the material which is being cut.

Obviously, the present invention is not limited to the illustrated example of construction and within the knowledge of those skilled in the art, can, in accordance with the foregoing description and illustrated drawings, be modified without thereby departing from the spirit and scope of the present invention.

I claim:

1. In combination with a power-driven hand drill rotatably coupled to a supplementary tool device to change rotary motion to reciprocatory motion, an improved sabre saw comprising a flat head portion including means for attaching said sabre saw to said tool device;

a shaft portion extending from said head portion to a remote end of said sabre saw;

said shaft portion having a rectangular cross section including four longitudinally extending edges;

a series of teeth formed along each of said edges, said teeth extending continuously from said head portion to said remote end, and said teeth being formed into helical rows with channels therebetween by twisting of said shaft portion; and said teeth having a formed configuration providing individual teeth tips directed toward said head portion so that a cutting stroke of said sabre saw takes place as said sabre saw moves toward said tool device.

2. The combination according to claim 1, in which each of said teeth has leading and trailing edges extending inwardly from each said tooth tip, and said leading and trailing edges each have substantially the same downward inclination toward said remote end.

* * * * *